United States Patent
Viken

(10) Patent No.: US 6,962,175 B2
(45) Date of Patent: Nov. 8, 2005

(54) PILOT VALVE OPERATED RECIPROCATING FLUID EXCHANGE DEVICE AND METHOD OF USE

(76) Inventor: James P. Viken, 9890 Crestwood Ter., Eden Prairie, MN (US) 55347

( * ) Notice: Subject to any disclaimer, the term of this patent is extended or adjusted under 35 U.S.C. 154(b) by 275 days.

(21) Appl. No.: 10/241,734

(22) Filed: Sep. 10, 2002

(65) Prior Publication Data

US 2003/0015463 A1 Jan. 23, 2003

Related U.S. Application Data

(63) Continuation-in-part of application No. 08/846,982, filed on May 1, 2001, now Pat. No. 6,446,682, which is a continuation of application No. 09/301,851, filed on Apr. 29, 1999, now Pat. No. 6,223,790.

(51) Int. Cl.[7] .............................................. B65B 1/04
(52) U.S. Cl. .......................... 141/59; 141/98; 141/65; 184/1.5
(58) Field of Search .............................. 141/59, 65, 98, 141/192, 198, 95; 184/1.5

(56) References Cited

U.S. PATENT DOCUMENTS

| | | |
|---|---|---|
| 2,951,450 A | 6/1960 | Fisher |
| 3,513,941 A | 5/1970 | Becnel |
| 3,849,033 A | 11/1974 | Schall |
| 4,123,204 A | 10/1978 | Scholle |
| 4,386,888 A | 6/1983 | Verley |
| 4,478,560 A | 10/1984 | Rupp |
| 4,548,551 A | 10/1985 | Ruttenberg et al. |
| 4,869,346 A | 9/1989 | Nelson |
| 5,232,352 A | 8/1993 | Robinson |
| 5,318,080 A | 6/1994 | Viken |
| 5,337,708 A | 8/1994 | Chen |
| 5,361,870 A | 11/1994 | Courcy |
| 5,370,160 A | 12/1994 | Parker |
| 5,447,184 A | 9/1995 | Betancourt |
| 5,505,593 A | 4/1996 | Hartley et al. |
| 5,522,474 A | 6/1996 | Burman |
| 5,616,005 A | 4/1997 | Whitehead |
| 5,641,003 A | 6/1997 | Rey et al. |
| 5,806,629 A | 9/1998 | Dixon et al. |
| 5,871,068 A | 2/1999 | Selby |
| 5,918,647 A | 7/1999 | Liaw |
| 6,035,903 A | 3/2000 | Few et al. |
| RE36,650 E | 4/2000 | Viken |
| 6,223,790 B1 * | 5/2001 | Viken ........................... 141/98 |
| 6,446,682 B1 * | 9/2002 | Viken ........................... 141/59 |

* cited by examiner

Primary Examiner—Steven O. Douglas
(74) Attorney, Agent, or Firm—Fulbright & Jaworski

(57) ABSTRACT

This invention provides a fluid system for exchanging used hydraulic fluid with fresh hydraulic fluid in an accessed hydraulic circuit. One particular application provides an exchange apparatus for exchanging fluids of the type found in motor vehicle hydraulic circuits. The exchange apparatus may utilize pressurized spent fluid flow as a fluid power medium to activate the auto-replenishing fluid exchanger system to replace the spent fluid with fresh fluid at equalized flow rates. Alternatively, the exchange apparatus may utilize pressurize fresh fluid as a fluid power medium to activate the exchange system. Additional power may be supplied by an external boost pump to supplement the flow of fluid.

27 Claims, 11 Drawing Sheets

PILOT VALVE OPERATED RECIPROCATING FLUID EXCHANGE DEVICE AND METHOD OF USE

RELATED APPLICATIONS

This is a continuation-in-part application of Ser. No. 08/846,982 filed May 1, 2001, now U.S. Pat. No. 6,446,682, issued Sep. 10, 2002, which was a continuation of Ser. No. 09/301,851 filed Apr. 29, 1999, now U.S. Pat. No. 6,223,790, each patent being incorporated by reference herein.

BACKGROUND OF THE INVENTION

1. Field of the Invention

The present invention relates to fluid exchange devices for replacing used fluid with a fresh fluid in a fluid circuit, and more particularly to an apparatus and method of use for achieving a fluid exchange of a fluid circulation circuit such as a vehicular automatic transmission, a vehicular power steering system, a vehicular engine oil system, or a vehicular cooling system.

2. Related Background Art

Various devices have been utilized to achieve fluid exchanges for vehicular automatic transmissions. Applicant's U.S. Pat. Nos. 6,378,657; 6,330,934; 6,267,160; 6,223,79; 6,164,346; 6,105,635; 6,082,416; RE36,65; 5,964,278; and 5,318,080 disclose devices, systems, or methods for performing a fluid exchange. Each of these patents are incorporated by reference herein in their entireties. The prior art also includes various externally powered exchange devices wherein the power to effect an exchange procedure is at least in part provided by an electric pump. Some of these externally powered devices utilize a vehicle's electric system for activation. One unresolved problem has been the need for a fluid exchange system which requires no external power source such as an electric motor or compressed air.

A need also exists for a device for servicing vehicular automatic transmissions having the following characteristics: one which requires no external powering source other than the fluid pressure from the accessed fluid circulation circuit; a reciprocating pump having a pump volume which is a fraction of the fluid volume necessary for the fluid exchange; an onboard fresh fluid supply tank reservoir of a capacity sufficient to perform a fluid exchange for most vehicle automatic transmissions; and a pump matching rates of flow and volumes exchanged during the and exchange procedure.

U.S. Pat. No. 6,223,790 discloses a system able to operate without electrical or compressed air power in its 1st and 5th embodiments, both embodiments being reciprocating fluid exchangers, and both of which employ a mechanically actuated spring and detent operated fluid control valve.

The need remains for such a self powered, fluid flow rate and volume equalized, fluid exchange system where any necessary fluid control valving is provided by an alternative mechanism which does not employ spring and detent, such as disclosed in the first and fifth embodiments of U.S. Pat. No. 6,223,790.

A fluid exchange unit for automatic transmissions, power steering and cooling systems which does not require connection to a vehicle's electric system would be desired. In addition, such a unit can be very portable and useful away from a service station given that no external power supply is required to operate the exchange device This portability is viewed as advantageous and desired by service technicians.

SUMMARY OF THE INVENTION

The present invention solves problems existent in prior hydraulic fluid exchange systems. The present invention provides a compact fluid exchange system having a pump volume which is substantially smaller than the total volume of fluid replaced during the exchange process. The apparatus can be used to service hydraulic fluid systems having a variety of circuit sizes, configurations, etc.

Briefly, the invention includes a cyclical pump having a pair of used fluid chambers and a pair of fresh fluid chambers. The pump receives used fluid from an accessed hydraulic fluid circuit into a used fluid chamber, introduces fresh fluid from fresh fluid chamber into the hydraulic fluid circuit, simultaneously refills the other fresh fluid chamber with fresh fluid, and simultaneously discharges spent fluid from the other used fluid chamber into a spent fluid receptacle. Fluid flow relative to the pump assembly is directed by control valves. The pump cycles until the predetermined exchange volume is satisfied (determined by such means as visual or optical comparison of fluid input and output, sensor devices, etc.). The invention permits connection to both a bulk fresh fluid supply and a floor drain, such as those typically found in vehicle repair facilities.

One object of the invention includes a reciprocating pump assembly having a power medium of a pressurized hydraulic fluid, such as used transmission fluid of an operating motor vehicle during a maintenance procedure, or pressurized fresh fluid from an external source.

One object of the invention provides a fluid exchange apparatus released from the requirement of having dedicated on-board fluid reservoirs. A remote bulk fresh fluid supply and remote waste fluid receptacle, such as those found in vehicle repair facilities, may be utilized to practice the present invention. In this manner, a smaller, more compact fluid exchange apparatus is provided.

One object of the present invention is a device which permits an efficient change between different fresh fluids (grades, additive packages, etc.) between or during exchange procedures. The limited volumetric capacity of the pump assembly and associated conduit results in a limited amount of the previous different fresh fluid charge held within the exchange apparatus.

One object of the invention is to provide a fluid exchanger which is self-powered by pressure in the accessed fluid circulation circuit thereby removing the need to connect the exchanger to the electrical system of a vehicle being serviced or to an external electrical outlet or compressed air supply. This allows a high degree of portability and minimizes the potential of electronic component damage.

Another object of the invention is to provide a fluid exchanger which is especially suitable to replace the contents of fluid systems in addition to automatic transmissions in vehicles. There is the need for a fluid exchanger which can be adapted and manufactured to replace the contents of fluid circuits such as those of vehicular cooling systems, engine oil systems, and power steering system, and as well the high flow, high pressure hydraulic circuits of heavy construction and other commercial and industrial equipment such as cranes, fork-lifts, front-loaders, plows, road graders, garbage trucks, hydraulically operated industrial and farm implement machinery, and aircraft hydraulic circuits, as well as many other fluid circulation circuits in everyday use or which will be later developed which can or will benefit from complete or near complete fluid exchanging.

One object of the invention is to provide a fluid control mechanism for a reciprocating fluid exchanger which may be powered by the accessed fluid circulation circuit, including low flow foreign vehicle automatic transmissions.

Another object of the invention is to also provide a fluid control mechanism which is reliably activated and more durable for exchanging the fluid of high fluid flow, high fluid pressure fluid circulation circuits such as large, commercial trucks or other industrial or commercial equipment or machines used in manufacturing.

The present invention provides a fluid exchange system in a preferred embodiment which employs a mechanically actuated pilot valve which in turn fluidly operates a used fluid control valve. A fluid exchange machine of the present invention can be utilize in exchange procedures for low to high fluid pressure systems. High pressure systems may include farm tractors, heavy construction machinery, and industrial machines used in manufacturing.

Another object of the invention is to provide a self-loading fluid exchanger which exchanges approximately equivalent volumes of fresh fluid for used fluid at approximately the same rates of flow, and a fluid exchanger with a pump capacity much smaller than the fluid capacity of its fresh fluid reservoir.

One object of this invention is to provide a simple mechanical automatic bypass valving system which requires no source of electrical power.

Another related object of the invention is a means to manually shift the exchanger into bypass mode.

Another object of the invention is to provide a fluid exchanger which can be utilized to exchange the fluid in other fluid circulation circuits, such as circuits containing motor or engine oil, hydraulic fluid, antifreeze or other coolant, water, chemicals, or products circulated in fluid circuits used in passenger vehicles, and commercial or industrial vehicles or equipment, or machines used in industry including food processing and chemical processing.

DESCRIPTION OF THE DRAWINGS

The present invention will be described hereafter in the Detailed Description of Preferred Embodiments, taken in conjunction with the following drawings, in which the reference numerals refer to like elements throughout.

DETAILED DESCRIPTION OF PREFERRED EMBODIMENTS

Figure 1:
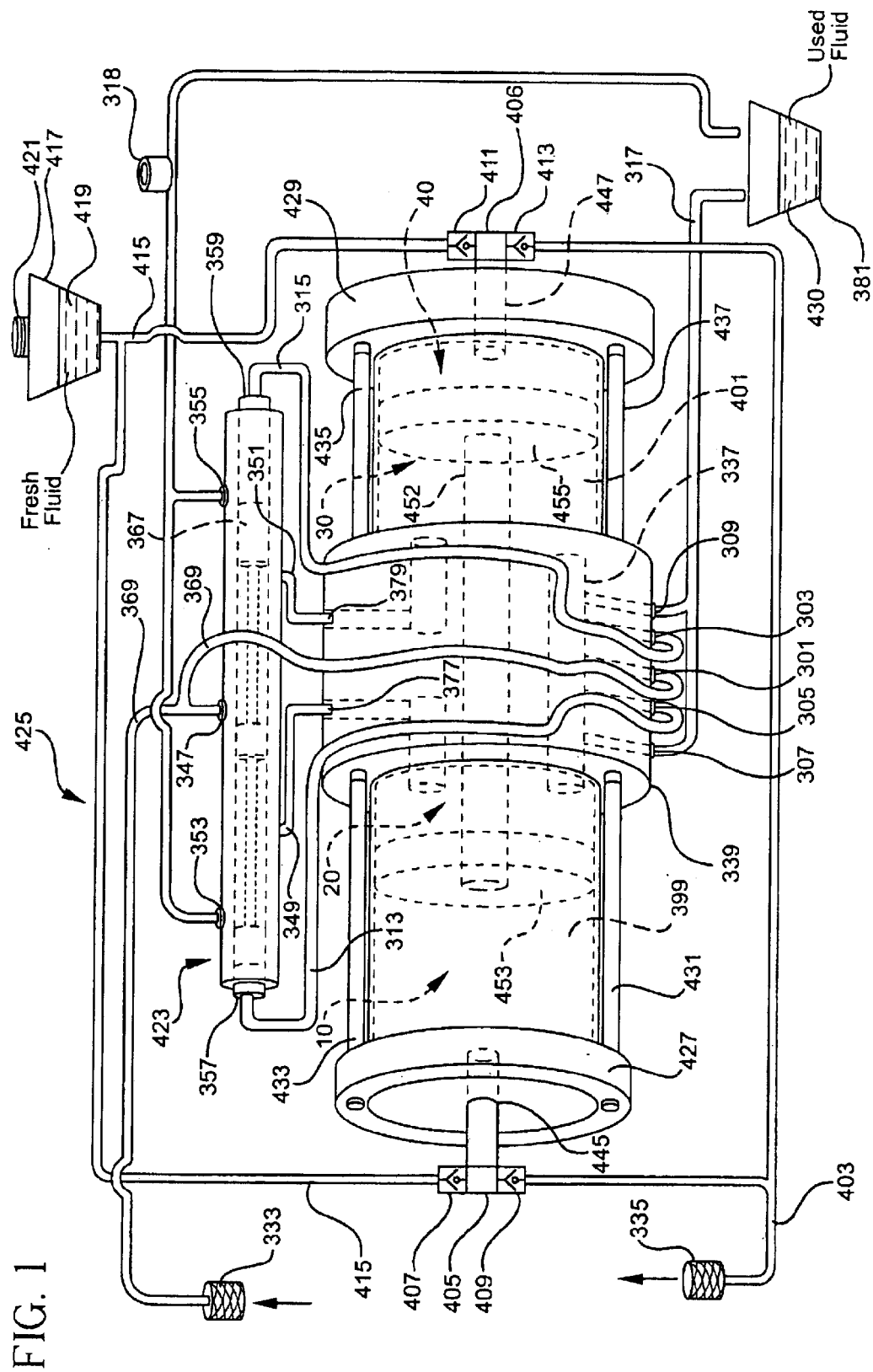
FIG. 1 is a perspective, partially diagrammatic, illustration of one embodiment of the present invention.
Figure 2:
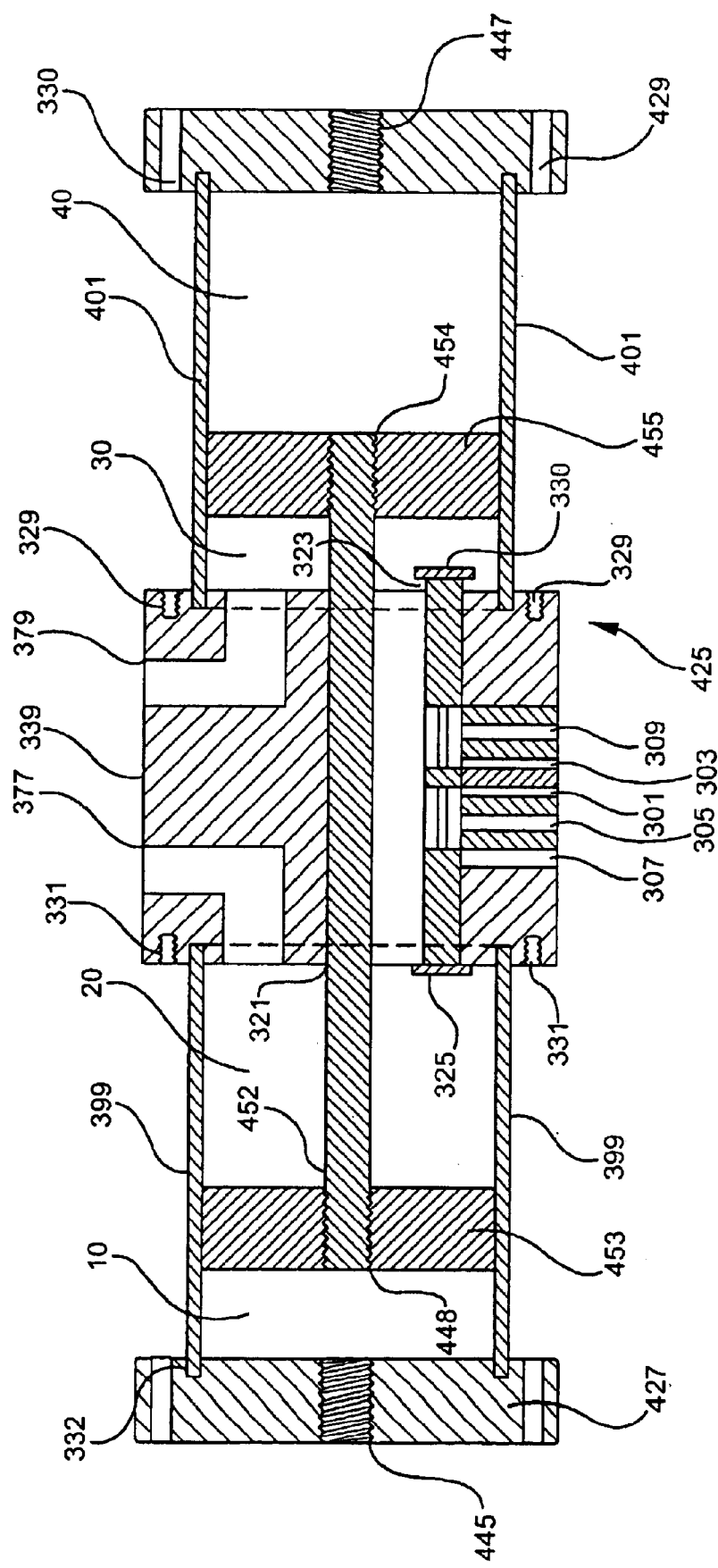
FIG. 2 is a cross sectional view of a portion of the embodiment of FIG. 1.

As shown in FIG. 1, one embodiment of the invention includes a pump 425 including two reciprocating pistons 453, 455 linked by a connecting rod 452 within a cylinder block 339 as further depicted in FIG. 2. Pump 425 includes a first and second used fluid pumping chambers 20, 30 and a first and second fresh fluid pumping chambers 10, 40. The pumping chambers 10, 20, 30, 40 are variable volume chambers with the volume of each being defined by the relative position of the pistons 453, 455 within cylinders 399, 401. As described in more detail hereinafter, in the embodiment of FIGS. 1 through 8, the driving force for pump 425 is supplied by pressurized used fluid received from an accessed hydraulic circuit wherein the pressurized used fluid is directed, in alternating manner, to either pumping chamber 20 or pumping chamber 30. Pump 425 has a used fluid control valve assembly 423 in communication with cylinder block 339 and used fluid received from the vehicle or other device being serviced. In an alternative embodiment, such as a device incorporating the valve of FIG. 9, the driving force for pump 425 may be supplied by pressurized used fluid (as provided by the accessed hydraulic circuit) and pressurized fresh fluid (as provided by an external fluid pump).

Pump 425 has a left cylinder 399 which is secured in position between a left cylinder head 427 and cylinder block 339 by four headbolts, two of which are shown, a headbolt 431 and a headbolt 433. Pump 425 has a right cylinder 401 which is secured in position between a right cylinder head 429 and cylinder block 339 by four headbolts, two of which are shown, a headbolt 435 and a headbolt 437. A conduit tee 405 is suitably connected to a port 445 of cylinder head 427. Conduit tee 405 includes a pair of checkvalves 407, 409. A conduit tee 406 is suitable connected to a port 447 of cylinder head 429. Conduit tee 406 includes a pair of checkvalves 411, 413.

A fresh fluid supply conduit 415 is attached to a fresh fluid tank assembly 417 at one end and to checkvalve 407 and checkvalve 411 at its other two ends. Tank 417 has a fill cap 421 which is vented and contains a fresh fluid supply 419. A fresh fluid conduit 403 is attached at one end to a quick connector 335 and attached to checkvalve 409 and 413 at its other two ends. A waste fluid conduit 317 is arranged at one end to discharge a used fluid 430 into a used fluid receiver 381 and connected to a waste port 307 of cylinder block 339 and to a waste port 309 of cylinder block 339 at its other two ends. A waste conduit assembly 311 is arranged at one end to discharge used fluid 430 into used fluid receiver 381 and is connected to a waste port 353 of valve 423 and to a waste port 355 of valve 423 at its other two ends. A sightglass 318 is provided to conduit assembly 311. Sightglass 318 permits the operator to view the clarity of fluid within conduit 311, for example so as to determine completion of an exchange procedure.

A used fluid supply conduit 369 is connected at one end to a quick connector 333 and connected to a port 347 of valve 423 and a port 301 of cylinder block 339 at its other two ends. Connector 333 is adapted to be coupled into the accessed fluid circuit, such as a vehicles automatic transmission cooling circuit so as to receive used fluid therefrom.

A conduit 313 connects a port 357 of valve 423 to a port 303 of cylinder block 339. A conduit 315 connects a port 359 of valve 423 to a port 305 of cylinder block 339.

FIG. 2 more fully illustrates pump assembly 425. Pistons 453, 455 each include threaded structures 448, 454, respectively, for coupling pistons 453, 455 to connecting rod 452. Pump 425 has a cylinder block 399 which is secured between cylinder head 427 and cylinder block 339 by four headbolts, two of which are shown in FIG. 1. Pump 425 has a cylinder 401 which is secured between cylinder head 429 and cylinder block 339 by four headbolts, two of which are shown in FIG. 1. In this particular embodiment, piston 453 and piston 455 are cylindrical in form, as is connecting rod 452, and cylinder 399 and cylinder 401. Other shapes and configurations of pistons, connecting rods, and cylinders can be utilized without departing from the art depicted herein in this embodiment.

Cylinder head 427 is provided with port 445. Cylinder head 429 is provided with port 447. Cylinder block 339 is provided with two ports, a port 377 which connects to first used fluid powering chamber 20, and a port 379 which connects to second used fluid powering chamber 30.

Cylinder block 339 has a bore 321 into which connecting rod 452 is slidingly received and suitably fitted to provide smooth sliding operation and limited leakage. Cylinder block 339 has two circumferencial glands 329, 331 which serve to hold two gaskets of suitable material, one per side (not shown), which gaskets are disposed between cylinder 399 and cylinder block 339, and between cylinder 401 and cylinder block 339. Cylinder head 427 has a circumferencial gland 332 which serves to hold a gasket of suitable material (not shown) between cylinder 399 and cylinder head 427. Cylinder head 429 has a circumferencial gland 329 which serves to hold a gasket of suitable material (not shown) between cylinder 401 and cylinder head 429. If desired, and/or in high pressure embodiment of the present invention, seals can be provided to rod 452, and pistons 453 and 455.

Figure 3:
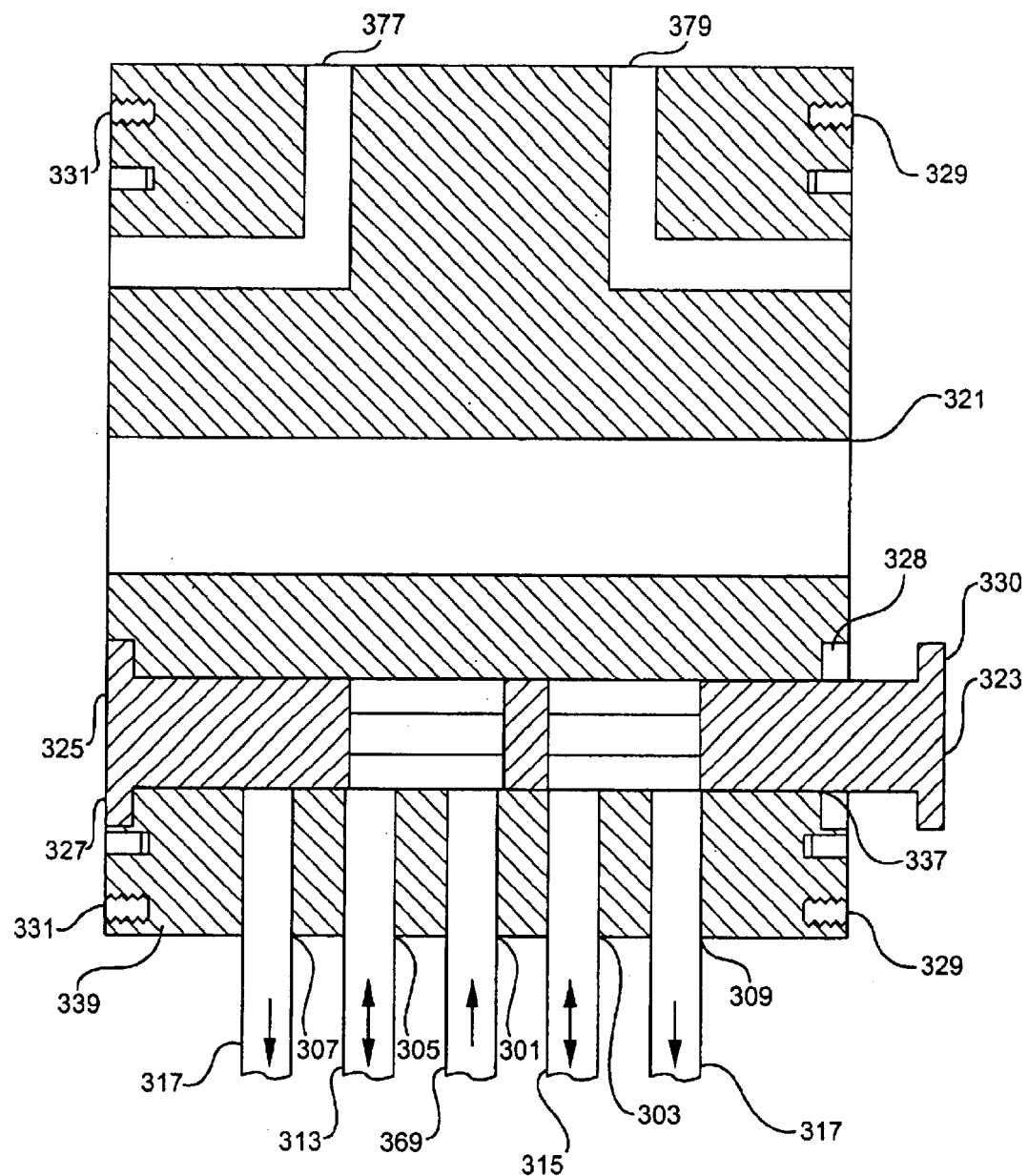
FIG. 3 is a cross sectional view of a portion of the embodiment of FIG. 1.

FIG. 3 depicts a cross sectional view of cylinder head 339 with a pilot valve spool 323 slidingly received into a pilot valve bore 337. As described with reference to FIGS. 5–8, spool 323 is repeatedly engaged and moved by pistons 453, 455 during an exchange procedure as pistons 453, 455 travel toward block 339. Bore 337 includes recessed areas 327, 328 at respective ends. Valve spool 323 has a right endstop 330 suitably secured to its right end and a left endstop 325 suitably secured to its left end. Endstops 325 and 330 are slidingly insertable into corresponding recessed areas 327, 328. Various means can be utilized to secure endstops 325 and 330 on end each of valve spool 323, such as matingly providing male threads to each end of valve spool 323 and female threads to each endstop 325 and 330. As with securing pistons 453 and 455 to connecting rod 452, a suitable thread locking compound can be applied to the threads in order to securely fix endstops 325 and 330 to valve spool 323. Recessed area 328 is sized to slidingly receive endstop 330, as is recessed area 327 sized to receive endstop 325. Valve spool 323 is configured to provide fluid communication between two pair of its ports 301, 303, 305, 307, 309 at a time.

As with cylinders 399, 401 and pistons 453, 455, alternate shapes for the pilot valve bore 337 and pilot valve spool 323 other than cylindrical can be used without departing from the art depicted herein, as long as the fit between each is suitably snug to prevent unacceptable levels of leakage. Pilot valve bore 337 has five ports 301, 303, 305, 307, 309. Port 301 is coupled to conduit 369. Port 303 is coupled to conduit 315. Port 305 is coupled to conduit 313. Waste port 307 and waste port 309 are coupled to waste conduit 317. No detent or position locking mechanism is required to hold spool 323 in place after it has been moved into each one of its two alternate, shifted positions which occur as a result of the movement of pistons 453, 455.

Figure 4:
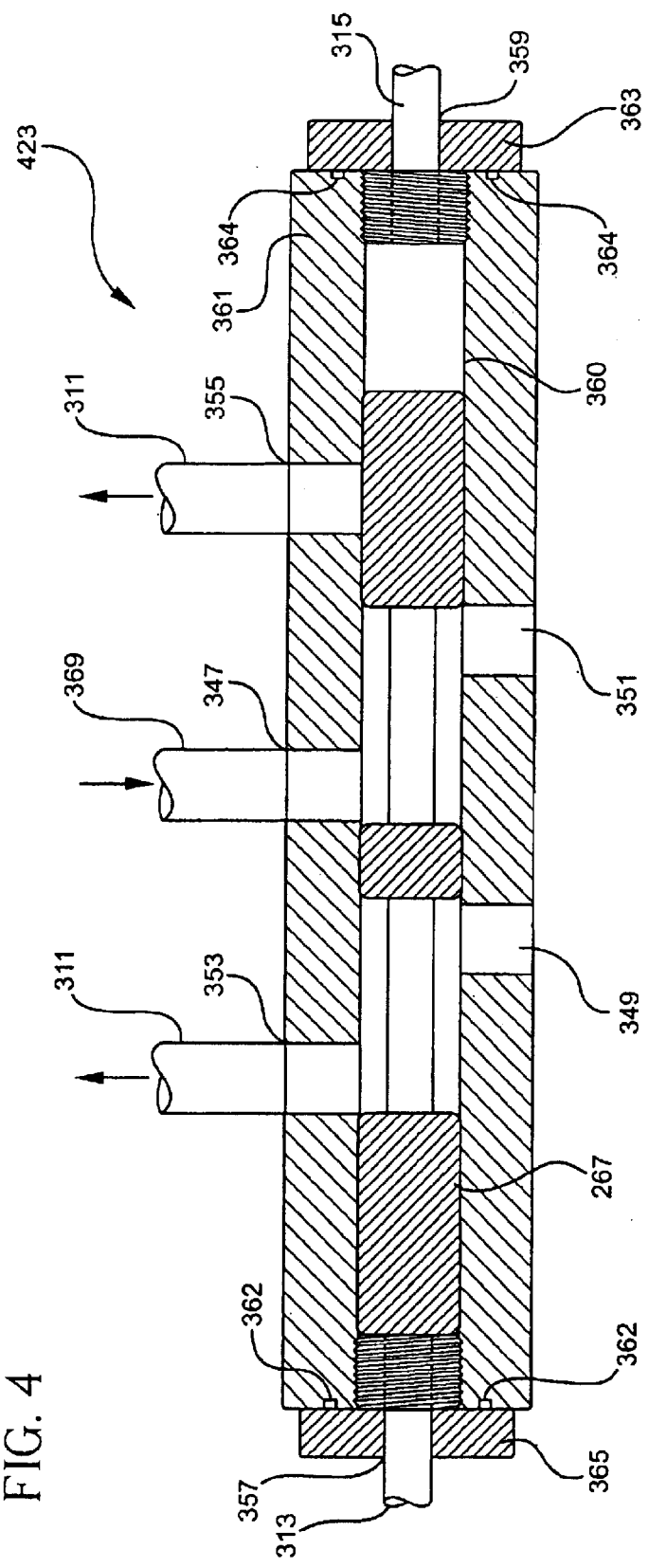
FIG. 4 is a cross sectional view of a portion of the embodiment of FIG. 1.

FIG. 4 depicts more clearly the used fluid control valve 423. Valve 423 has a valve body 361. Valve body 361 has a valve bore 360 into which a valve spool 367 is slidingly received. Valve bore 360 is provided with seven ports 347, 349, 351, 353, 355, 357, 359. Valve 423 includes a threaded end plug 363 and a threaded endplug 365. Port 357 is connected to conduit 313 and port 359 is connected to conduit 315. Valve body 361 is provided with an O-ring gland 362 at one end and an O-ring gland 364 at the other end. Port 349 is in fluid communication with port 377 of cylinder block 339. Port 351 is in fluid communication with port 379 of cylinder block 339. In another embodiment, valve assembly 423 may be is secured directly to cylinder block 339 (not shown). This direct mounting of valve 423 to cylinder block 339 directly connects ports 349 and 351 of valve 423 to ports 377 and 379 of cylinder block 339, respectively. Port 347 is connected to conduit 369, and ports 353 and 355 are connected to waste conduit 311. Valve spool 367 is configured to provide fluid communication between two ports at a time depending on its particular position within valve body 361. The particular position of valve spool 367 in the valve bore 360 determines which adjacent ports communicate with each other.

Operation of the Embodiment of FIGS. 1–4

FIGS. 5 through 8 illustrate operation of the embodiment of the present invention of FIGS. 1 through 4. FIGS. 5 through 8 are partially diagrammatic in that arrows represent fluid flow within the exchange device during an exchange procedure.

The closed fluid circulation circuit of an automatic transmission, or other hydraulic fluid circulation circuit is accessed and opened to provide a higher pressure side and lower pressure or return side. Adapters with matingly compatible connections (not shown but understood by those with ordinary skill in the art) are connected at one end of each to one side each of the opened fluid circulation circuit, which in this case is the cooling circuit of an automatic transmission. The remaining end of each adapter is matingly connected to a selection of one of the pair of quick connectors 333 and 335 of FIG. 1, with the adapter connected to the pressure side of the circuit connected to quick connector 333 and the adapter connected to the low pressure or return side of the circuit connected to quick connector 335. The use of specific adapters or connectors is not an necessary element of the present invention. A variety of connection approaches may be made to inteconnect the exchange device of the present invention with a hydraulic circuit, such as an automatic transmission of a vehicle.

FIGS. 5 through 8 illustrate that valve spool 367 is movable within valve bore 360 in response to fluid pressures communicated through conduits 313, 315. The position of valve spool 367 in valve bore 360 of used fluid control valve 423 is determined by the position of valve spool 323 in pilot valve bore 337 which itself is determined by whether piston 453 or piston 455 last made contact valve spool 323. The direction of movement and the actual point of reversal of direction of movement of piston/rod/piston assembly 453/452/455 as illustrated in FIGS. 5 through 8 is determined by which of the two positions valve spool 367 of valve 423 is in. There is a causal interdependency between valve spool 323, valve spool 367, and the direction of movement of piston/rod/piston assembly 453/452/455 which results in a circular chain of events. This chain of events starts with the fluid pressure of the accessed fluid circulation circuit maintaining both valve spools 323 and 367 in position while simultaneously moving piston/rod/piston assembly 453/452/455 in the direction as determined by valve spools 323 and 367.

When the fluid circulation circuit being serviced is pressurized, in this case when the engine is started and operated to render the automatic transmission operative to pump fluid through its cooling circuit, used fluid flows from the cooling circuit through quick connector 333, into conduit assembly 369 to thereby supply pressurized used fluid to port 347 of control valve assembly 423 and port 301 of cylinder block 339. Used pressurized fluid from the accessed hydraulic circuit provides the power necessary to effect a fluid exchange using embodiments of the present invention.

The particular path of the pressurized used fluid after flowing through port 347 is dependent on the position that valve spool 367 is in within valve bore 360. In any event, pressurized used fluid is directed in alternating manner to one of the used fluid pumping chambers 20, 30. In operation, the pistons 453, 455 move in a repeated cyclical manner. Check valves 407, 409, 411, 413 control the flow of fluid within conduits 403, 415.

Figure 5:
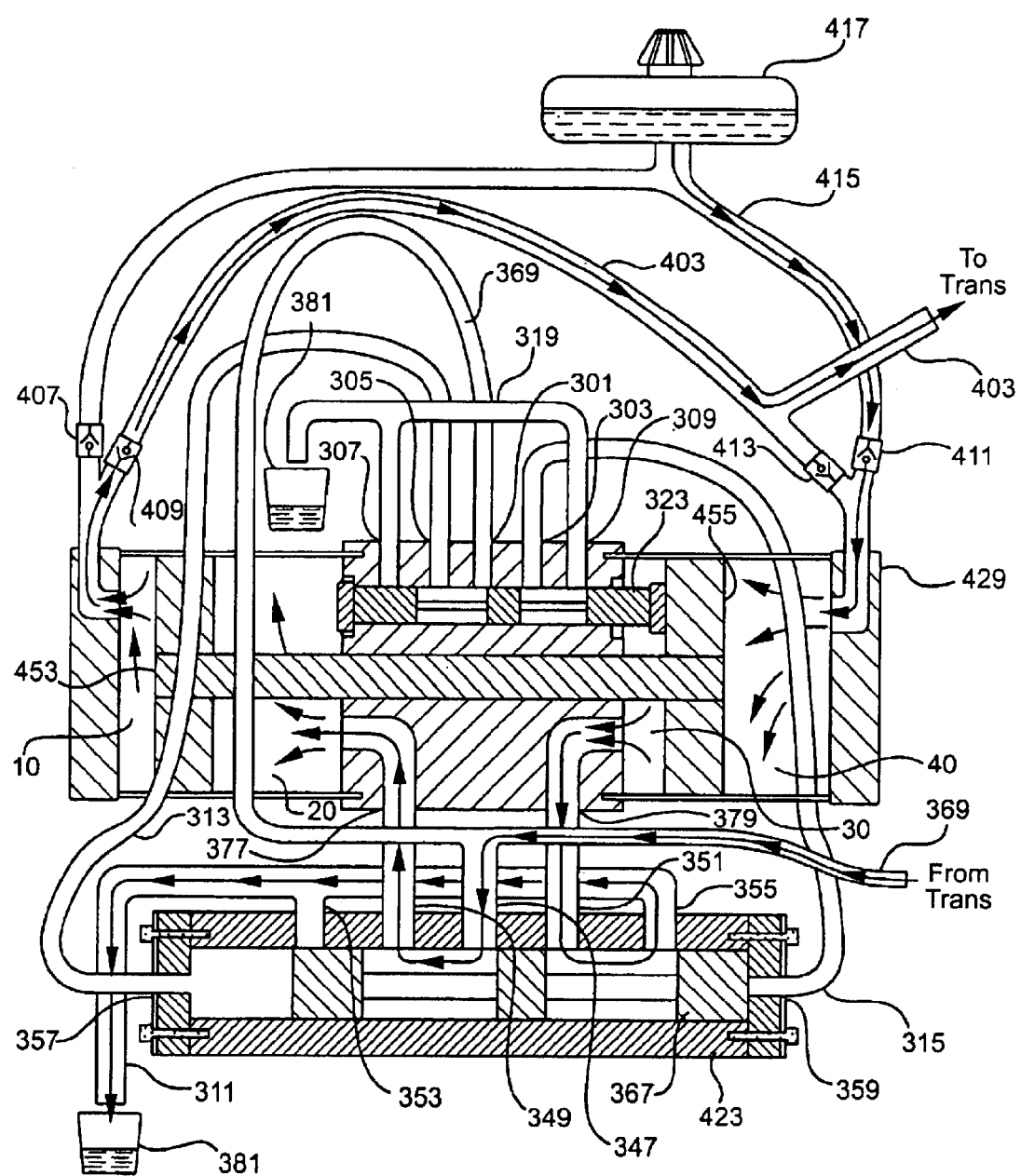
FIGS. 5 through 8 are diagrammatic illustrations of operation of the embodiment of FIGS. 1–4.

FIG. 5 illustrates used pressurized fluid being received into valve 423 through ports 347, 349 and into port 377 of block 339 where it enters used pumping chamber 20. Pressurized used fluid within chamber 20 forces piston 453 away from block 339 to have the following effects: (1) fresh fluid within chamber 10 is forced into conduit 403 for introduction into the accessed circuit, (2) used fluid within chamber 30 is directed through ports 351, 355 of valve 423 and into conduit 311 for disposal in receiver 381, and (3) fresh fluid is drawn into chamber 40 through conduit 415 from fresh fluid supply 417. Piston 453 continues to move away from block 339 until the condition of FIG. 6 is reached.

Figure 6:
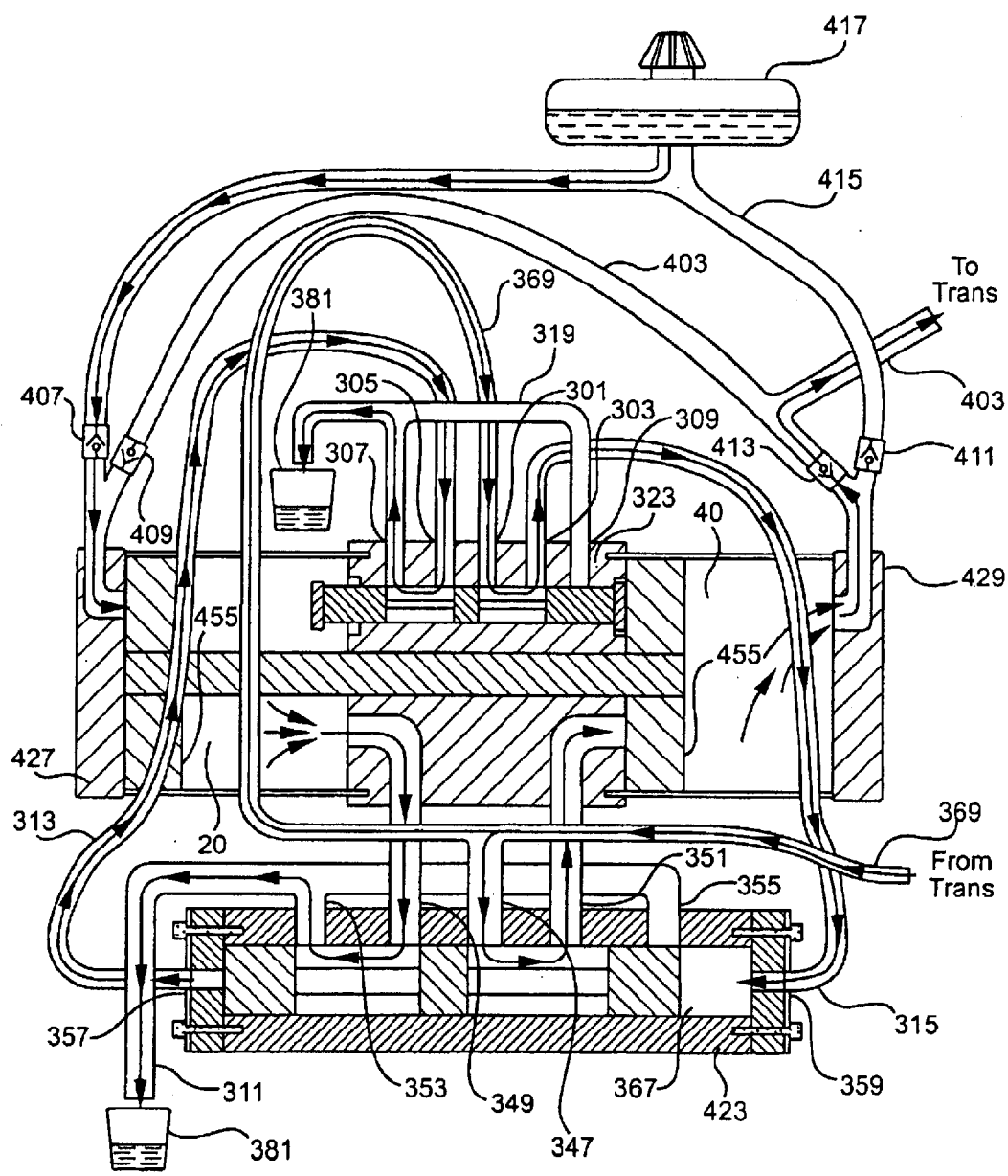
Figure 7:
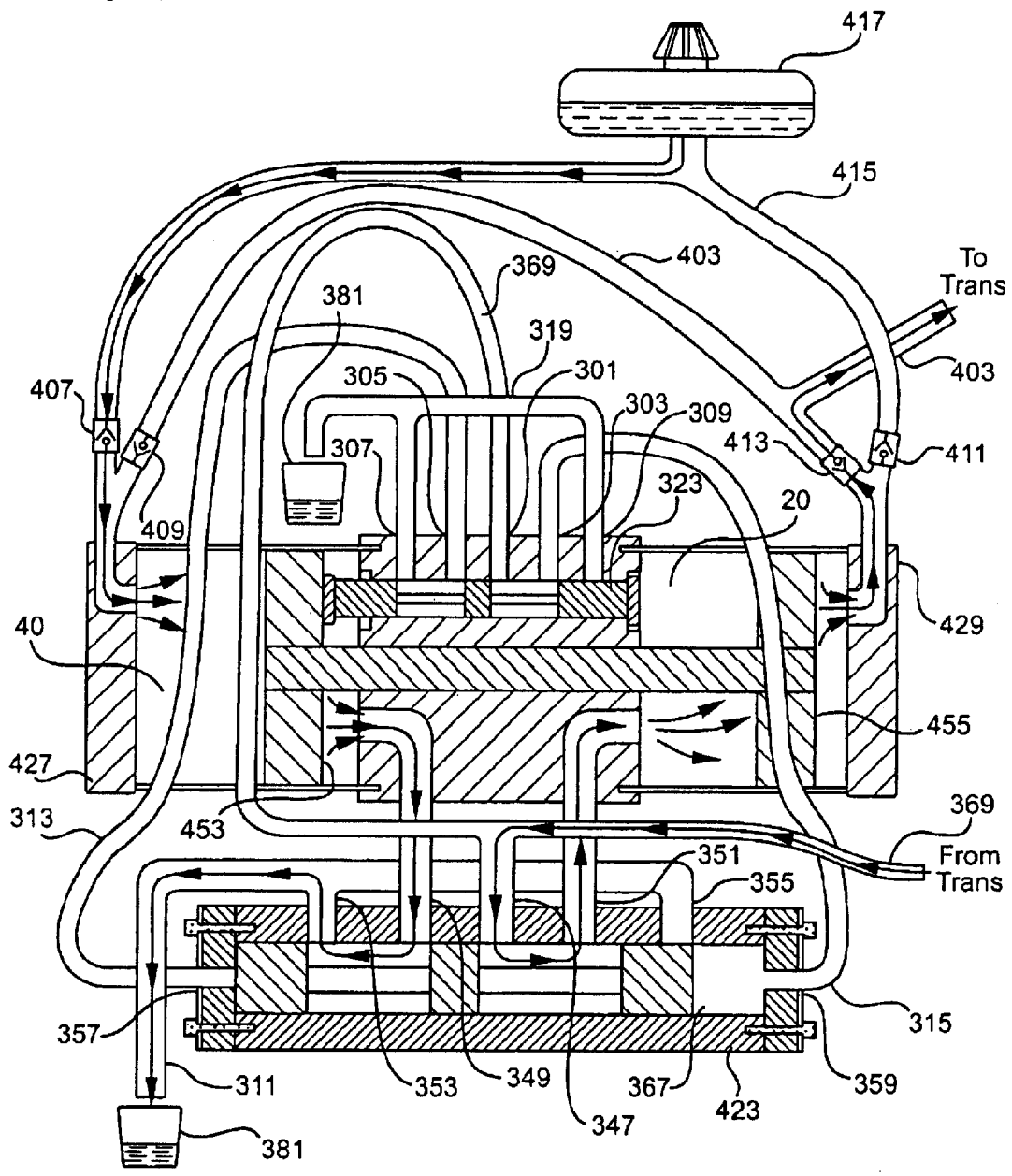

FIGS. 6 and 7 illustrate movement of valve spools 367, 323 relative to that of FIG. 5. FIGS. 6 and 7 illustrate used pressurized fluid being received into valve 423 through ports 347, 351 and into port 379 of block 339 where it enters used pumping chamber 30. Pressurized used fluid within chamber 30 forces piston 455 away from block 339 to have the following effects: (1) fresh fluid within chamber 40 is forced into conduit 403 for introduction into the accessed circuit, (2) used fluid within chamber 20 is directed through ports 349, 353 of valve 423 and into conduit 311 for disposal in receiver 381, and (3) fresh fluid is drawn into chamber 10 through conduit 415 from fresh fluid supply 417. Piston 453 continues to move away from block 339 until the condition of FIG. 7 is reached, i.e. piston 453 is in contact with valve spool 323. As piston 453 move closer to block 339, valve spool 323 is biased into its other position as indicated in FIG. 5.

Figure 8:
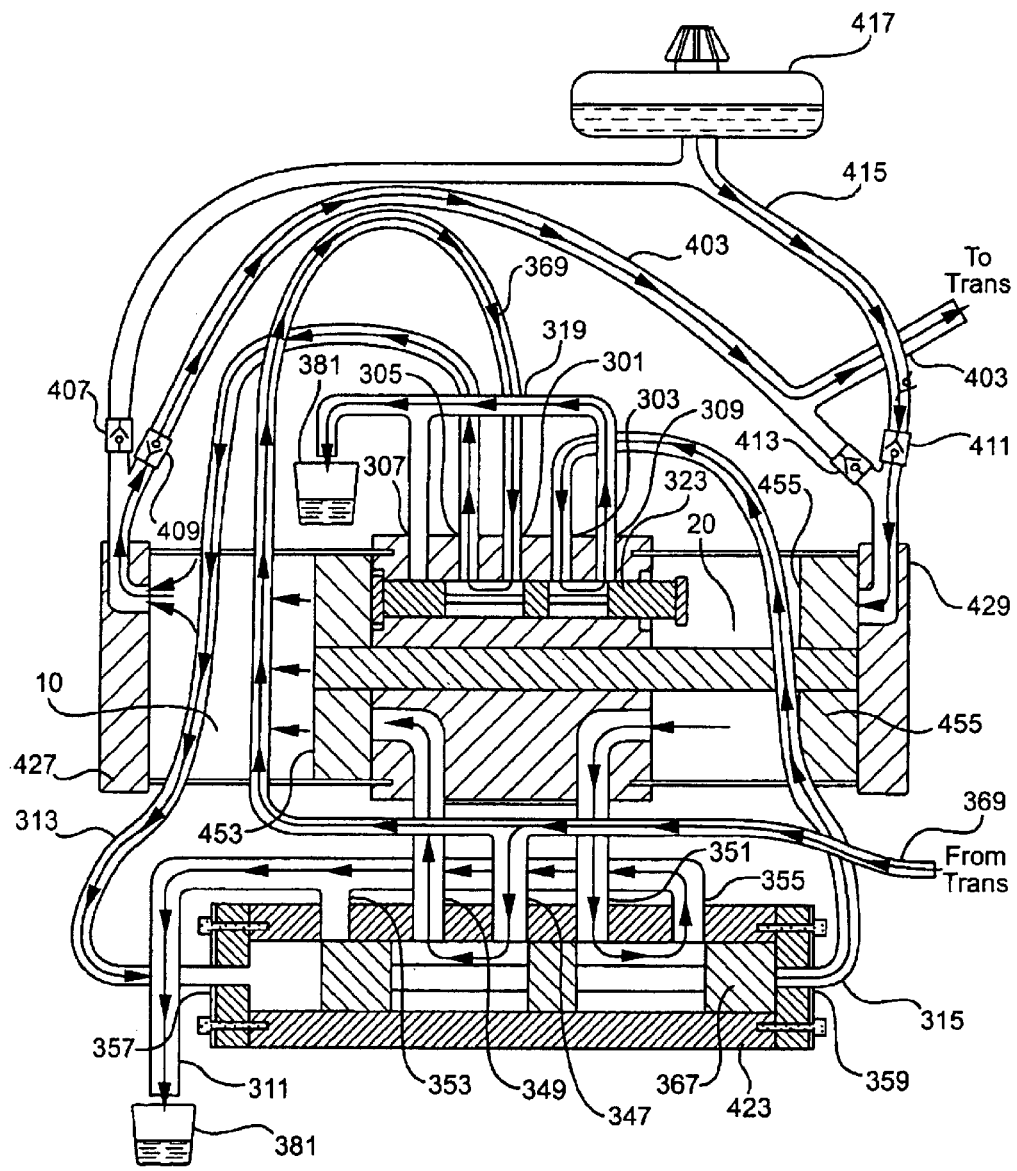

FIG. 8 illustrates movement of valve spool 323 into its other position thereby effecting a change in the position of valve spool 367. Upon valve spool 367 assuming the position as indicated in FIG. 8, used pressurized fluid being received into valve 423 through ports 347, 349 and into port 377 of block 339 where it enters used pumping chamber 20. Pressurized used fluid within chamber 20 forces piston 455 away from block 339 to have the following effects: (1) fresh fluid within chamber 10 is forced into conduit 403 for introduction into the accessed circuit, (2) used fluid within chamber 30 is directed through ports 351, 355 of valve 423 and into conduit 311 for disposal in receiver 381, and (3) fresh fluid is drawn into chamber 40 through conduit 415 from fresh fluid supply 417. Piston 453 continues to move away from block 339 until the piston 455 contacts valve 323. As piston 455 move closer to block 339, valve spool 323 is biased into its other position as indicated in FIGS. 6 and 7. The cyclical interaction between pistons 453, 455 and valves 323 and 367, as illustrated in FIGS. 5 through 8, continues during the exchange procedure whereby quantities of used fluid and fresh fluid are exchanged. As pumping chambers 10, 20, 30, 40 have equivalent size, the flow rates between used and fresh fluid are substantially equivalent. The exchange procedure may be terminated by an operator, such as after viewing the used fluid in sightglass 318 to determine completion of the exchange.

Figure 9:
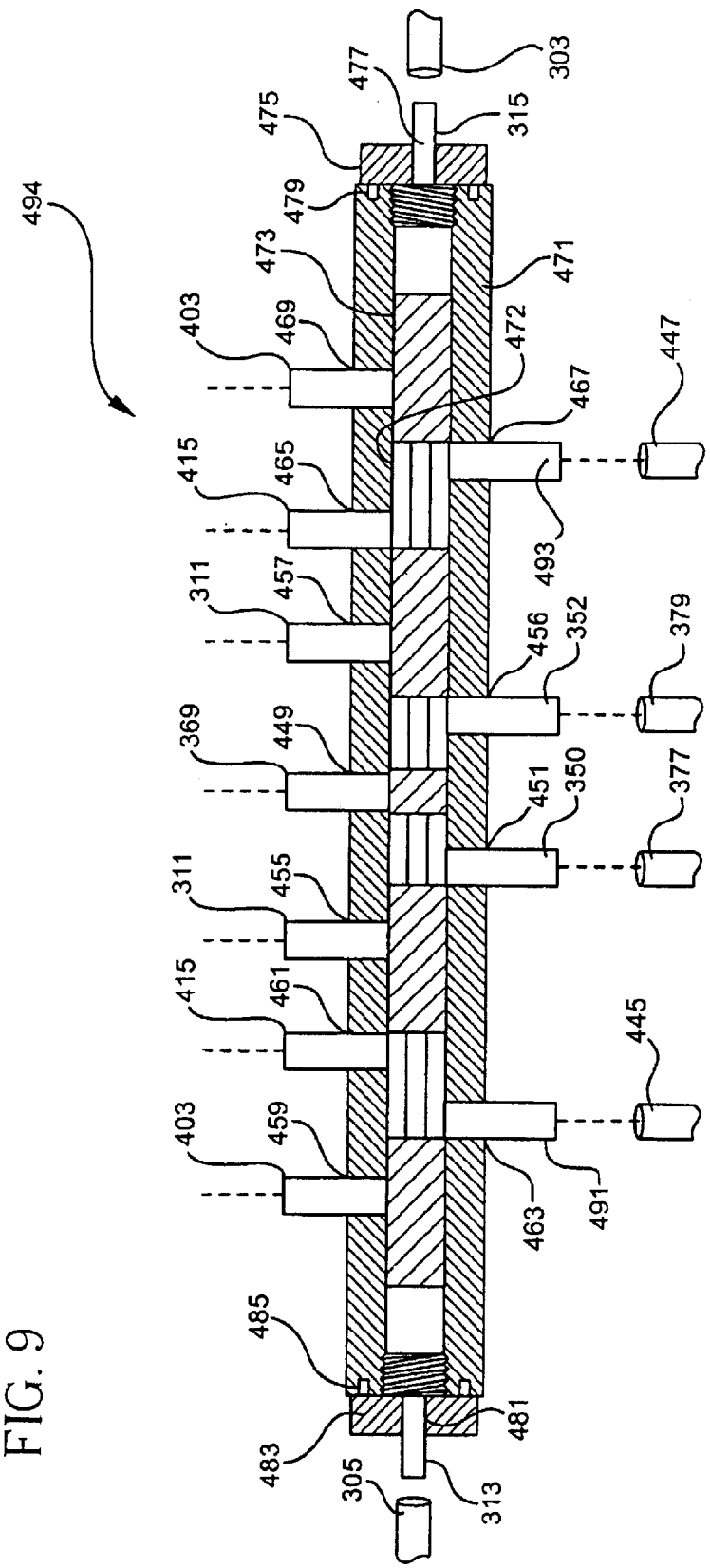
FIG. 9 is a diagrammatic cross sectional view of a control valve for use in an alternative embodiment of the present invention.

FIG. 9 illustrates a combination fresh and used fluid control valve assembly 494. This valve can be substituted for the used fluid control valve 423, conduit tees 405, 406 and checkvalves 407, 409, 411, and 413 of the embodiment of FIGS. 1 through 8. This substitution is desirable when a pressurized fresh fluid supply is substituted for open, vented tank 417. Such a pressurized fresh fluid supply (not shown but understood by someone of ordinary skill in the art) can be comprised of the addition of an onboard air powered or electrically powered pump connected in series or parallel (with a bypass around such a pump and a downstream flowing checkvalve) to deliver and/or to augment the flow of fresh fluid 419 from fresh fluid tank 417. This is indicated when fresh fluid 419 cannot be adequately drawn into pump 425. An air powered pump (not shown) can be powered by a stored and regulated onboard supply of compressed air held in a suitable pressure vessel. An electric powered pump can be powered by an onboard rechargeable battery or a removable and replaceable battery pack.

Valve 494 has a valve body 471 and is provided with a valve bore 472 receiving a valve spool 473. Valve body 471 has thirteen ports 451, 456, 449, 455, 457, 459, 461, 463, 465, 467, 469, 477, 481, of which ports 477 and 481 are integral one each with a threaded end plug 475, 483. Both threaded end plugs 475 and 483 are provided with O-ring glands 485 and 479 respectively, to which O-rings which are suitably resistant to fluid 419 of tank 417 and fluid of used fluid receiver 381. Port 456 is coupled to conduit 352 in fluid communication with port 379. Port 451 is coupled to a conduit 350 in fluid communication with port 377. Port 463 is coupled to a conduit 491 which is connected to port 445. Port 467 is coupled to a conduit 493 which is connected to port 447. Port 481 is coupled to a conduit 313 which is connected to port 305. Port 477 is coupled to a conduit 315 which is connected to port 303. Ports 459 and 469 are coupled to conduit 403 which is coupled to quick connector 335 of FIG. 1. Ports 461 and 465 are coupled to conduit 415 which is connected to tank 417 of FIG. 1. Ports 455 and 457 are coupled to conduit 311 which directs fluid into fluid receiver 381 of FIG. 1. Port 449 is coupled to conduit 369 which is connected to quick connector 333 of FIG. 1.

The combination fresh & used fluid control valve assembly 494 of FIG. 9 when installed on the first preferred embodiment depicted in FIGS. 1–8, provides an additional preferred feature of allowing the use of a pressurized fresh fluid source feeding conduit assembly 415.

In operation, when conduit 313 is provided pressurized fluid from pilot valve spool 323 through conduit 313 while conduit 315 is vented by pilot valve spool 323 through conduit 315, valve slide 473 of valve assembly 494 is moved to the right side of valve bore 472 and is held in place against threaded end plug 475. This results in the fluid connection of ports 461 and 463, 451 and 449, 456 and 457, and 467 and 469, which in turn results in the fluid connection of conduits 491 and 415, 350 and 369, 352 and 311, and 493 and 403.

This right position (as indicated in FIG. 9) of valve spool 473 in valve bore 472 results in the following events: used fluid from conduit 369 is provided to the left used fluid powering chamber 20 which moves piston/connecting rod/piston assembly 453/452/455 to the left, thereby providing fresh fluid from the left fresh fluid chamber 10 to conduit 403, and fresh fluid is simultaneously provided to right fresh fluid chamber 40 from tank assembly 417 through conduit 415, while also simultaneously forcing used fluid from right used fluid powering chamber 30 to be discharged into conduit assembly 311 for delivery into used fluid receiver 381.

As piston/connecting rod/piston assembly 453/452/455 reaches its end of stroke against cylinder head 339, the pilot valve spool 323 is moved into its right position, bring left endstop 330 fully into cavity 328. This results in pressurized used fluid being provided to conduit 315 and port 477 and pilot valve spool 323 venting the captive fluid through port 481 to conduit 313. This results in valve spool 473 being moved to its left position against threaded end plug 483. This shifting of pilot valve spool 473 from its right position to its left position, reverses the movement of piston/connecting rod/piston assembly 453/452/455, which then results in the following fluid connections being made by valve assembly 494, fluid connection is established between ports 463 and 459, 451 and 455, 456 and 449, and 467 and 465, which in turn results in the fluid connection of conduits 491 and 403, 350 and 311, 352 and 369, and 493 and 415.

This second position of valve spool 473 in valve bore 472 results in the following events:
used fluid from conduit 369 is provided to the right used fluid powering chamber 30 which moves piston/connecting rod/piston assembly 453/452/455 to the right, thereby providing fresh fluid from the right fresh fluid chamber 40 to conduit 403, and fresh fluid 419 is simultaneously provided to left fresh fluid chamber 10 from tank assembly 417 through conduit 415, while used fluid is also discharged from left used fluid powering chamber 20 into conduit assembly 311 for delivery into used fluid receiver 381.

Use of valve 494 allows the provision of a delivery pump to conduit assembly 415. It also allows the application of a flow-augmenting boost pump to conduit assembly 415. Each of these options establishes the use of the pumping chambers 10, 40 as combination pumping and powering chambers in addition to chambers 20, 30. These options allow the removal of any portion of or all of the total resistance applied to the fluid circulation circuit being serviced with a fluid exchange, thereby allowing the removal of a portion or all of the work being done by the fluid pressure provided by the fluid circulation circuit for the fluid exchange. This is especially useful to increase the speed in which the fluid of low pressure, low flow fluid circulation circuits may be replaced. If the total fluid resistance of a fluid exchange system is significant, flow in the accessed circuit may be reduced to such an extent that damage to the system can occur. Utilization of the present invention may reduce the fluid resistance of a fluid exchange machine so that embodiment of the present invention may be used in a variety of different fluid circuits.

Figure 10:
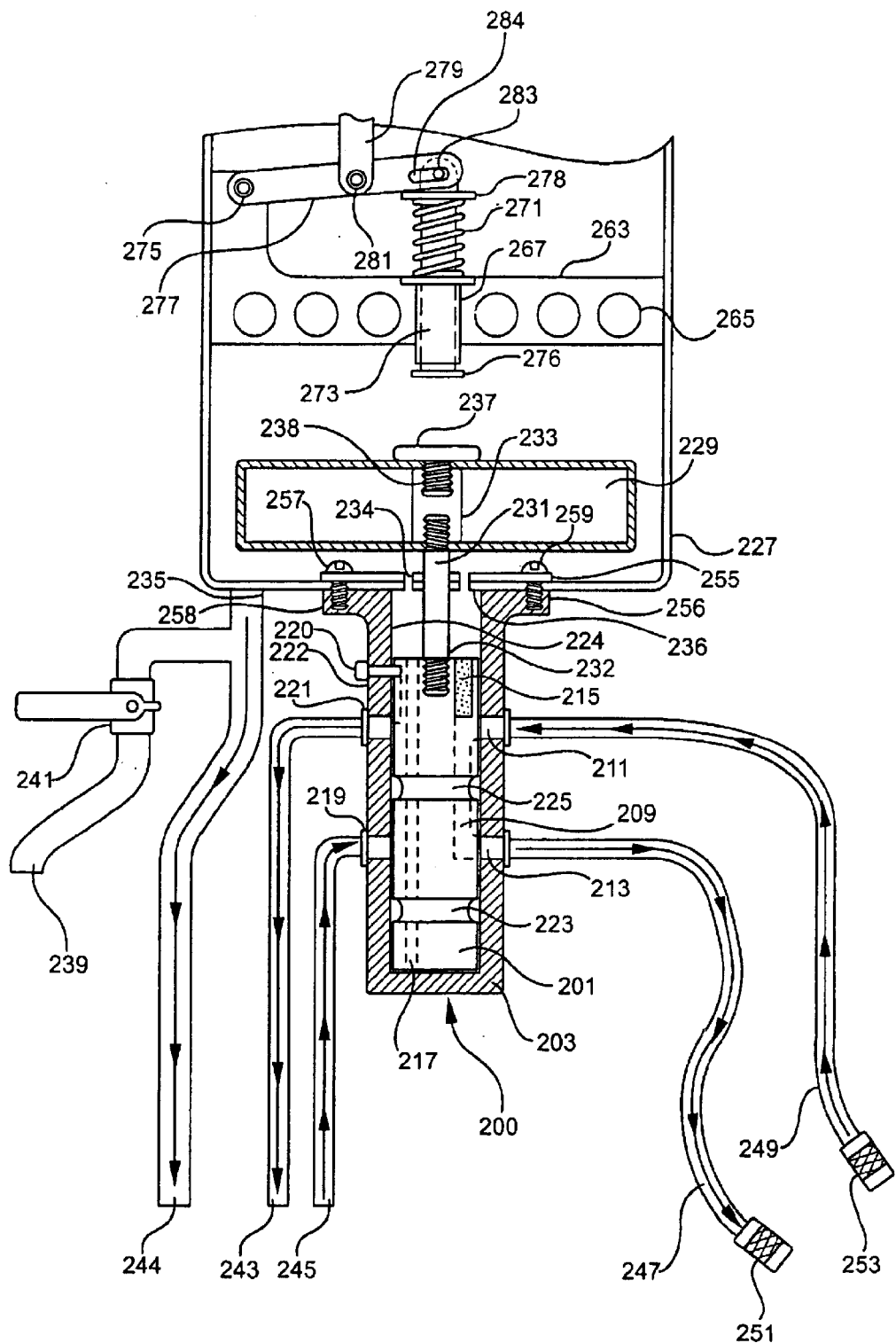
FIG. 10 is a diagrammatic cross sectional view of a bypass valve assembly for use in another embodiment of the present invention.
Figure 11:
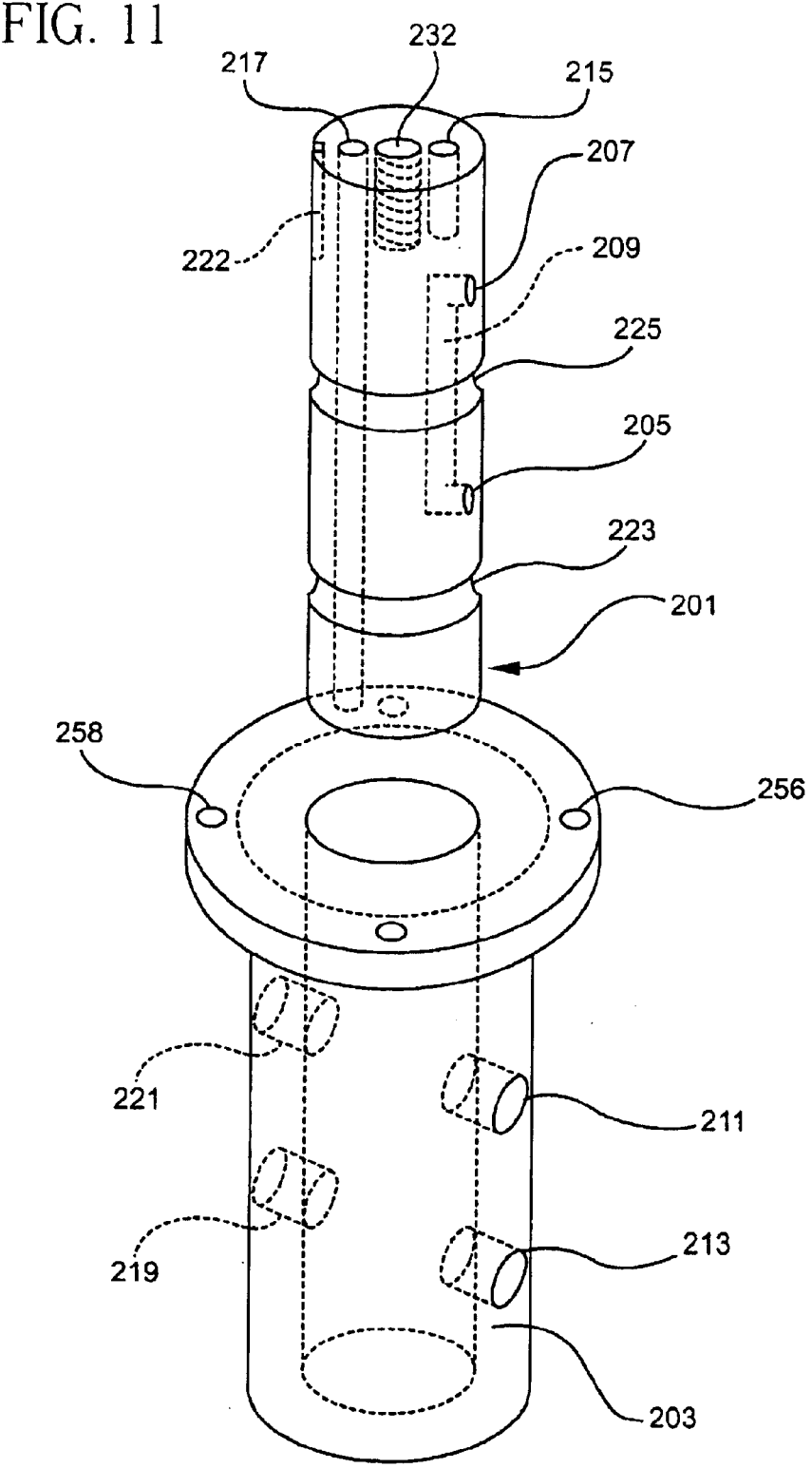
FIG. 11 is a perspective view of a portion of the bypass valve of FIG. 10.

FIGS. 10 and 11 illustrate a float operated automatic bypass valve for use in alternative embodiments of the present invention. FIGS. 10 and 11 do not show the reciprocating parts of the fluid exchanger since a number of embodiments are interchangeably usable. The necessary fluid lines for connecting to the reciprocating part of the fluid exchanger are however shown.

A floater operated bypass valve assembly 200 is comprised of a valve body 203 with a valve slide 201. Valve body 203 is provided with an incoming port 211 for spent fluid from transmission and an outgoing port 213 for fresh fluid delivery. Valve 203 also has an inlet port 219 for fresh fluid provided by the pump and an outlet port 221 for spent fluid from the accessed circuit. Valve slide 201 has an internal fluid passage 209 which, when in proper position with valve slide 201 in its downward position, connects incoming port 211 to outgoing port 213. Valve slide 201 has a plug 215 which is secured and sealed into the machining access port end of passage 209, allowing the easy machining of passage 209 without custom casting if so desired. Valve body 203 and valve slide 201 may be constructed of steel, aluminum or other suitable or desired alloys, or can be constructed of a number of suitable plastics including the highly durable acrylics and carbon fiber compounds as well as suitable nylon type compounds or other special plastic compounds fluorinated for durability and prevention of fluid absorption. Valve slide 201 is provided with a vertical vent passage 217 and an anti-rotation vertical alignment slot 222. Valve body 203 has a threaded port 224 to receive a male threaded pin 220 for anti-rotation slot 222.

Valve slide 201 has a circumferential fluid passage for fresh fluid provided by exchanger 223 and a circumferential fluid passage for spent fluid provided to exchanger 225. A fresh fluid reservoir tank 227 is provided and is connected to valve body 203 and a reinforcing plate 255 by a set of screws 257 and 259 (the additional two screws are not shown). Tank 227 is provided with a float which is connected to valve slide 201 by a male threaded at both ends shaft 231, which is screwed into a female threaded receiver 232 of valve slide 201 at one end and which is screwed into float 229 at a female threaded receiver 233. A fluid vent port 234 and a fluid vent port 236 are provided to tank 227 and support plate 255. Tank 227 has a fresh fluid outlet port 235 which is connected to a fresh fluid inlet supply tube 244 which is in turn also connected to a two position lever operated on/off ball valve 241 which is in turn connected to a drain outlet tube 239. Float 229 has a female threaded receiver 238 into which a threaded bearing 237 is screwed. Port 219 is connected to a fresh fluid outlet supply tube 245. Port 221 is connected to spent fluid inlet tube 243. A fresh fluid outlet hose 247 connects port 213 to a female quick connect 251. A spent fluid inlet hose 249 connects port 211 to a female quick connect 253. Quick connect 251 is connected to an adapter which is in turn connected to the outlet side of an opened cooling circuit of an automatic transmission (not shown). Quick connect 253 is connected to an adapter which is in turn connected to the return side of an opened cooling circuit of an automatic transmission (not shown). Valve body 203 is provided with 4 female threaded receivers, of which two are shown, female threaded receivers 256 and 258 which receive screw 257 and screw 259.

Tank 227 is provided with a cross bar support bracket 263 which has a plunger guide 267 and set of weight saving bracket holes 265. Plunger guide 267 holds a plunger 273 which has a retainer end 276 on its bottom end and a plunger return spring 271 and a washer 278 on its top end. Plunger 273 is provided with a pivot pin 275. Bracket 263 has a horizontal lever 277 which has two holes, one placed to hold to pivot pin 275 and the other a slide slot 284 which is rotatable on a slide pin 283 which is affixed to the top of plunger 273. Horizontal lever 277 is fitted at approximate mid point with a pivot pin 281 which receives a vertical lever 279. Vertical lever 279 is connected to a manually operated detent assembly (not shown). Note, that pivot pins 275 and 281 and slide pin 283 are provided with suitable fasteners such as end-mounted retainer clip caps (not shown).

Tank 227 and all of its integral parts, including float 229 may be made of steel, aluminum, suitable alloys, or suitable plastics or fiberglass compounds. Float 229 should be highly buoyant and filled with air or other suitable gas or lighter than oil foam plastic, each of which should be either shielded from oil by sealing technology (for example fluorination) or comprised of oil insensitive materials.

When fresh fluid reservoir tank 227 is empty, float 229 is in its lowermost position and causes valve body 201 via shaft 231 to also be in its lowermost position under power provided by the weight of float 229, bearing 237 and shaft 231. Float 229 is constructed of material light enough and large enough to be sufficiently buoyant in automatic transmission fluid to overcome its own weight of shaft 231, the weight of valve slide 201, and any resistance to movement of shaft 231 and valve slide 201, all cumulative, such that valve slide 201 will rise to its uppermost position when tank 227 has a sufficient volume of fluid to allow the reciprocating exchanger to operate. On the other hand, the sum total weights of float 229, bearing 237, shaft 231 and valve body 201 must be great enough to overcome any resistance to movement that exists when the fluid level in tank 227 has dropped below a level providing any buoyancy to float 229.

Fresh automatic transmission fluid is added into the fresh fluid reservoir tank 227 to a level well above the float and it is contained herein until consumed and discharged by the reciprocating fluid exchanger disclosed in this specification which can be connected to tubes 243, 244 and 245. This fresh fluid then displaces float 229 thereby raising float 229 to its uppermost position which simultaneously raises shaft 231 which pulls valve slide 201 to its uppermost position. Note: if the operator has inadvertently filled tank 227 with the wrong type of fluid desired, he or she can drain that fluid out at drain outlet tube 239 by opening ball valve 241 until that fluid is all out.

Vertical lever 279 is held by a detent mechanism in its upward position (detent mechanism not shown) and is not holding float 229 in its downward position. Of course, the operator can choose to move this lever 279 to a lower detented position at anytime which will move lever 277 downward to overcome plunger return spring 271 and any buoyancy provided by any fluid in tank 227, thereby causing plunger 273 to move its downward position to make contact with bearing 237 to thereby simultaneously force float 229 and valve slide 201 to their downward positions. Vertical lever 273 can be so moved if the operator desires to use lever 279 as a manual override for the automatic bypass valve function provided by fluid buoyancy to float 229 and can also be manually raised at any time from its lower detented position to its upper detented position.

When vertical lever 279 causes valve slide 201 to move its downward position this causes the valve slide to assume its downward position which establishes a bypass fluid connection between hoses 249 and 247 through ports 211 and 213 through the internal fluid passage 209 of valve slide 201. Correspondingly when the fluid level in tank 227 is depleted to the point of denying sufficient buoyancy to float 229, valve slide 201 also is caused to move its downward position under the sum total weight of float 229, bearing 237, shaft 232 and the valve slide 201 itself, thereby also establishing a bypass connection between hoses 247 and 249.

When a bypass connection is established between hoses 247 and 249, the transmission can freely circulate its fluid through the exchange device and its cooling circuit without any fluid exchanging occurring or without any significant loss of volume of fluid. This can allow the operator time to evaluate the flow rate and clarity of the fluid, as well as determine the current level of fluid in the transmissions pan as verified by checking the dipstick indication.

When vertical lever 279 is in its upward detent position and there is a sufficient level of fluid in tank 227, the buoyancy provided to float 229 by the fluid raises valve slide 201 to its upward position when thereby causes port 211 to communicate with port 221 through the circumferential fluid passage 225 while simultaneously causing port 213 to communicate with port 219 through circumferential fluid passage 223, while also simultaneously causing fluid passage 209 to be blocked by valve body 203. When valve slide 201 is caused to be in its upward position by buoyancy provided to float 229 by a sufficient volume of fluid contained in tank 227, the communication of port 211 and 221 and the simultaneous communication of port 213 to 219 occurs and this causes the reciprocating fluid exchanger to operate if the transmission is operative to pump fluid into its cooling circuit to circulate therein.

This operation of the reciprocating fluid exchanger then is accompanied by the flow of fresh fluid from tank 227 to the fresh fluid inlet of the reciprocating exchanger (not shown) through tube 244, the flow of spent fluid from the transmission cooling circuit into and through connector 253 through hose 249, through port 211, through circumferential fluid passage 225, through port 221 and into and through tube 243 to the reciprocating exchanger, and this is also simultaneously accompanied by the outflow of fresh ATF from the reciprocating exchanger to the transmission cooling circuit into and through tube 245, via passage through port 219, through circumferential fluid passage 223, through port 213, through hose 247 and through connector 251.

As long as the fluid level of tank 227 is high enough to provide sufficient buoyancy to float 229, valve slide 201 stays in its upward position and allows the reciprocating fluid exchanger to operate as long as the transmission is operative to pump spent fluid into its cooling circuit to circulate it therein. As soon as the reciprocating exchanger has consumed enough fresh fluid from tank 227 as provided through port 235 and tube 244 to cause the fluid level to drop in tank 227 to the point of denying sufficient buoyancy to float 229, float 229 drops to its lower position along with valve slide 201 thereby causing the bypass valve assembly 200 to function in its bypass mode. As long as there is a sufficient volume of fresh fluid in tank 227 to provide enough or sufficient buoyancy to float 229 to cause valve slide 201 to assume and remain in its upper position, bypass valve assembly 200 will function in and remain in its fluid exchange mode.

Known to those of ordinary skill in the art are various methods of connecting conduits together and to valves and to quick connectors or other fittings, and these methods include the use of many types of hose barbs, push-lock and ferrule secured, or other types such as tubing inserted into plastic push-lock receivers. For sake of brevity these are not shown. Also known to those of ordinary skill in the art are various methods of establishing fluid communication between desired fluid system components, such a flexible hose type conduits of appropriate composition for the fluid being exchanged, and use of other types of tubing and conduit material including flexible plastic, bent metals of a variety of compositions, and braided high pressure, reinforced hydraulic hose with machine or hand installed end fittings. For sake of brevity these are not shown. As is known to those of ordinary skill in the art, the actual composition and type of any conduit selected as well as the inside diameter chosen must be based on length of fluid delivery, pressure of the fluid and acceptable resistance levels, and the desired operating characteristic of the conduit arrangements. For example, if a fluid exchange system is designed to exchange the fluid of very low flow fluid circulation circuits, a relatively large inside diameter, and relatively short selection and arrangement of conduits is desirable and indicated. For sake of brevity the extensive type, compositions and pressure and chemical resistance ratings of the various type of conduits, flexible and rigid will not be discussed herein since these considerations are understood by those with ordinary skill in the art.

Many other types and configurations of movable fluid separation members (in these embodiments pistons 453, 455) can be used such as diaphragms linked by a connecting rod, or linked rotors. In addition the number of fluid chambers provided, the number of fluid separation members, the number of connecting rods, and the number of pilot valves and fluid control valves can be quite varied without departing from the art. For example, one could construct a fluid exchange system comprised of two pilot valves, each with isolated functions providing half the needed actuation of a pilot valve or valves if more than one used. Such a system could include two pilot valves with isolated functions providing half the needed control and could incorporate four pistons and three connecting rods between them linking them. Alternatively, one could use three diaphragms with two connecting rods and size theses diaphragms such that the volumes of fluid moved by two during operation of the system to exchange fluid equal the volume moved by the third, thus provided proper approximate equalization between fresh fluid introduction to the fluid circulation circuit and used fluid delivery out of the fluid circulation circuit having its fluid exchanged. Any number of sizes and configurations of fluid separation members with the numeric double number of chambers can be selected with the appropriate corresponding number of connecting rods, and as well. Any number of sizes and configurations of pilot valves and fluid control valve can be selected according to this novel art, as long as the necessary functions required for proper reciprocating operation will be provided for, as will be further explicated. A wide selection of suitable materials can be used to construct the preferred embodiments including special fiberglass resins and exotic plastic compounds, depending on the heat and pressures which must be handled, and materials which include specialized aluminum alloys and aluminum/magnesium alloys, as well as various grades of steel. In this case the preferred embodiments pump assembly, pilot valve and fluid control valve are constructed of aircraft grade aluminum alloy. If diaphragms are used as the fluid separation members, the use of seals, if needed at all, is only an issue where the connecting rod slidingly impacts its bore. One could of course alternatively position the used fluid powering chambers at either ends of the pump, one each, and the fresh fluid pumping chambers at the inside bordering the cylinder block, one to each side of it, and this would result in the piston/rod/piston assembly being pushed rather than being pulled. The same pilot valve configuration could be used without affecting the overall fluid changing function, and this would be true for the use of other types of linked fluid separation members, such as diaphragms or rotors. In the case of using pistons as the fluid separation members, such as in the preferred embodiments herein, piston rings and seals of various types can be fitted. Or alternatively, relatively tight piston to cylinder wall clearances can be used providing sufficient sealing without the cost of such seals. In the preferred embodiments herein piston to cylinder wall clearances are approximately 0.001 inch providing an acceptable seal without significant piston to cylinder wall resistance.

Not shown but understood by those with ordinary skill in the art is the manner in which the embodiment of FIG. 1 is connected to an opened fluid circulation circuit which will have its fluid exchanged. After the fluid circulation circuit is opened at a suitable location, adapters which are matingly compatible are then connected to either side of the opened circuit, one each. These adapters terminate in quick connectors which are matingly compatible with the quick connects 333, 335 of FIG. 1. The adapter connected to the pressure side of the circuit must then be connected to quick connect 333 and the adapter connected to the low pressure side must then be connected to quick connect 403. If a fluid flow alignment mechanism (such as depicted in U.S. Pat. Nos.: Re.36,650; 6,082,418; 6,27,160; or 6,330,934) is incorporated into conduits 369, 403, it is not necessary for the operator to identify the higher pressure side of the opened circuit before connecting conduits 369, 403 to the adapters which have been connected to either side of the opened circuit, one to each. Adapters can be constructed of a wide variety of suitable materials and lengths and this will not be discussed further because it is understood by those with ordinary skill in the art and for the sake of brevity.

Another preferred embodiment (not shown) is one which has no pilot valve, but instead has an equivalent structure comprised of a combination of position sensors mounted in either the cylinder block or cylinder heads of the pump assembly and an electrical solenoid operated hydraulic valve receiving fluid pressure from the fluid pressure of the fluid circulation circuit being serviced, directly or indirectly. There are a number of types of position sensors available which function suitable such as use of magnetically triggered micro-switches, hall-effect sensors as well as other more sophisticated types such as inductive sensors. These sensors can be configured and arranged to alternatingly activate a latching relay configuration which in turn alternatingly energizes and holds energized an electric solenoid until de-energized by a second sensor signal at opposite end of stroke which then de-energizes the solenoid of a two-position four way valve or equivalent. Latching relays can mechanical or solid state. Because latching relays can hold their connection even after the triggering electric current is stopped, they are applicable to this embodiment. In this way pressurized fluid pressure and venting are alternatingly provided to each end of the fluid control valve under control of the latching relay and the triggering signals which activate the relays switching of connections. Thus, this positions sensor based valve actuating mechanism can be arranged and configured for a piston to trigger a positions sensor when it reaches its end of stroke, which in turn triggers a latching relay which holds the solenoid on and the valve in that first position until the alternate position sensor is activated by the opposite end of stroke position of that piston (or any other piston used) which thereby unlatches the relay removing power from the solenoid and allows its spring return to the opposite position to hold the valve in its alternate and second position. This embodiment requires an electric supply, but a rechargeable battery or plug in batter pack can be used to allow the desired portability of the unit away from any power supplies and without connection to the electrical systems of the vehicles being serviced. Many other valve types can be used to provide same or the equivalent function, such as the use of two two-position three way valves, one for each end of the control valve which alternatingly provides pressure and vent to waste for each sensed piston end of stroke. One could also use a equivalent selection and arrangement of two position two-way valves such as simple solenoid operated on/off valves, or even a selection of check valves and/or priority valves which attain the same functional results without the same exact, specific structure. What is important is the overall function of the valve configuration, best referred to as a valve control system or configuration, rather than the particular and specific types of valves used and their arrangement and configuration.

In addition, one could use a compressed air powered pilot valve and fluid control valve, with the pilot valve in the cylinder block or at each cylinder head with spring return or equivalent operated by compressed air and which alternatingly routes compressed air and venting to each end of the fluid control valve. Any needed compressed air could be provided to and stored in an onboard pressure tank of the fluid exchange unit and this would still allow the highly desired portability within or around the service center.

It is understood that even though numerous characteristics and advantages of the present invention have been disclosed in the foregoing description, the disclosure is illustrative only and changes may be made in detail. Other modifications and alterations are within the knowledge of those skilled in the art and are to be included within the scope of the appended claims.

What is claimed is:

1. A fluid exchange device for replacing used fluid from an accessed hydraulic circuit with fresh fluid from a fresh fluid source, said device comprising:
   a pump having at least four variable volume fluid chambers including a first working fluid chamber, a second working fluid chamber, a first pumping fluid chamber and a second pumping fluid chamber;
   a control valve, operatively coupled to the pump, said control valve having a first valve position and a second valve position;
   a first conduit for receiving used fluid from the accessed hydraulic circuit;
   a second conduit for introducing fresh fluid into the accessed hydraulic circuit;
   a third conduit operatively coupling the first conduit to the first working fluid chamber when the control valve is in the first valve position, and operatively coupling the first conduit to the second working fluid chamber when the control valve is in the second valve position;
   a fourth conduit operatively coupling the second working fluid chamber to a used fluid receptacle when the control valve is in the first valve position, and operatively coupling the first working fluid chamber to the used fluid receptacle when the control valve is in the second valve position;
   a fifth conduit operatively coupling the second conduit to the first pumping chamber when the control valve is in the first valve position, and operatively coupling the second conduit to the second pumping fluid chamber when the control valve is in the second valve position; and
   a sixth conduit operatively coupling the second pumping fluid chamber to a fresh fluid source when the control valve is in the first valve position, and operatively coupling the first pumping fluid chamber to the fresh fluid source when the control valve is in the second valve position.

2. The fluid exchange device according to claim 1, wherein the movable pump member is selected from among the group consisting of a diaphragm member and a piston member.

3. The fluid exchange device according to claim 1, wherein the first and second working chamber and the first and second pumping chambers longitudinally aligned.

4. The fluid exchange device according to claim 1, wherein the control valve includes one or more elements selected from among the group consisting of a directional control valve, a spool valve, and an electromagnetic valve.

5. The fluid exchange device according to claim 1, wherein the control valve comprises either a valve element within the pump, a valve element external to the pump, or both.

6. A method of exchanging fresh fluid from a fresh fluid source for used from an accessed hydraulic fluid circuit having an outlet port and an inlet port, said method comprising the steps of:
   providing a pump having at least a first and a second, working chamber each having a port for communicating with the used fluid, and at least a first and a second pumping chamber each having a port for communicating with the fresh fluid;
   providing a control valve in communication with the pump, said control valve having at least a first valve position and a second valve position;
   for a first predetermined period of time, providing the control valve in the first valve position, wherein the first working chamber is fluidly coupled to the outlet port of the accessed hydraulic circuit, and the second working chamber is fluidly coupled to a used fluid receptacle, and the second pumping chamber is fluidly coupled to the fresh fluid source, and the first pumping chamber is fluidly coupled to the inlet port of the accessed hydraulic fluid circit, thereby providing a flow of used fluid from the outlet port of the accessed hydraulic circuit into the first working chamber, a flow of used fluid from the second working chamber into the used fluid receptacle, a flow of fresh fluid from the fresh fluid source into the second pumping chamber, and a flow of fresh fluid from the first pumping chamber into the inlet port of the accessed hydraulic circuit;
   after said first predeterminedd period of time, providing the control valve in the second valve position for a second predetermined period of time, wherein the second working chamber is fluidly coupled to the outlet port of the accessed hydraulic circuit, and the first working chamber is fluidly coupled to the used fluid receptacle, and the first pumping chamber is fluidly coupled to the fresh fluid source, and the second pumping chamber is fluidly coupled to inlet port of the accessed hydraulic fluid circuit, thereby providing a flow of used fluid from the outlet prot of the accessed hydraulic circuit into the second working chamber, a flow of used fluid from the first working chamber into the used fluid receptacle, a flow of fresh fluid from the fresh fluid source into the first pumping chamber, and a flow of fresh fluid from the second pumping chamber into the inlet port of the accessed hydraulic circuit;
   after said second predetermined period of time, establishing a cycle by returning the control valve to the first valve position for said first predetermined period of time; and
   repeating the cycle to achieve the fluid exchange.

7. The method of exchanging fluid according to claim 6, wherein the pump is selected from among a group consisting of a dual diaphragm pump and a dual piston pump.

8. A fluid exchange device for replacing used fluid from an accessed hydraulic circuit with fresh fluid from a fresh fluid source, said assembly comprising:
   a pump having at least four variable volume fluid chambers: a first working fluid chamber, a second working fluid chamber, a first pumping fluid chamber and a second pumping fluid chamber,
   a control valve operatively coupled to the pump, said control valve having a first valve position and a second valve position;
   a first conduit for receiving used fluid from the accessed hydrualic circuit, said first conduit being coupled to the first working fluid chamber when the control valve is in the first valve position, and said first conduit being coupled to the second working fluid chamber when the control valve is in the second valve position; and a second conduit for conducting fresh fluid to the accessed hydraulic circuit, said second conduit being coupled to the second pumping fluid chamber when the control valve is in the first valve position, and said second conduit being coupled to the first pumping fluid chamber when the control valve is in the second valve position.

9. The fluid exchange device according to claim 8 wherein the control valve includes a plurality of valves including a pilot valve which is engaged by a pump member and an external valve having a valve body an interior valve.

10. The fluid exchange device according to claim 8, said device further comprising:

a used fluid receptacle; and a third conduit for receiving used fluid from the pump and conducting used fluid to the used fluid receptacle, said thrid conduit being coupled to the second working fluid chamber when the control valve is in the first valve position, and said third conduit being coupled to the first working fluid chamber when the control valve is in the second valve position.

11. A fluid exchange device according to claim 8, said device further comprising:

a forth conduit for receiving fresh fluid from the fresh fluid source and conducting fresh fluid to the pum, said forth condit being coupled to the second pumping fluid chamber when the control valve is in the first valve position, and said forth conduit being coupled to the frist pumping chamber when the control valve is in the second valve position.

12. A fluid exchange device according to calim 8, wherein the control valve includes at least one mechanical valve including a spool valve and a valve body.

13. A fluid exchange device according to calim 8, wherein the pump structure is selected from among a group consisting of dual diaphragm pump, a dual piston pump, and a reciprocating element pump.

14. A fluid exchange device according to claim 8, wherein the control valve includes a plurality of directional control valves.

15. A fluid exchange assembly according to claim 14, wherein the control valve includes a pair of directional control valves coupled to each of the first and second pumping fluid chambers.

16. A reciprocating fluid exchange apparatus for exchanging fresh fluid with used fluid from an accessed transmission circuit, said exchange apparatus, composing:

a pump having a first working fluid chamber, and a second working fluid chamber, and a first pumping fluid chamber, and a second pumping fluid chamber;

a first conduit for receiving used fluid from the accessed transmission circuit;

a second conduit for supplying fresh fluid to the accessed transmission circuit; and a control valve operatively coupled to the first conduit and the second conduit for directing used fluid from the accessed transmission circuit alternately into the first working fluid chamber and then the second working fluid chamber casuing a movement of the reciprocating element to direct fresh fluid disposed in a selected one of the first and second pumping fluid chambers into the second conduit to be introduced into the accessed transmission circuit.

17. The reciprocating fluid exchange apparatus according to claim 16, wherein the control valve incudes a plurality of directional control valves.

18. The reciprocating fluid exchange apparatus according to claim 16, wherein the control valve includes a pilot valve and an external valve.

19. The reciprocating fluid exchange apparatus according to claim 18 wherein the pilot valve is actuated by a reciprocating element of the pump.

20. A method of exchanging fresh fluid from a fresh fluid source for used fluid from an accessed hydraulic fluid circuit having an outlet port and an inlet port, said method comprising the steps of:

providing a pump having at least a first and second working chamber each having a port for communicating with the used fluid, and at least a first and second pumping chamber each having a port for communicating with the fresh fluid;

wherein during a first operating condition the first working chamber is fluidly coupled to the outlet port of the accessed hydraulic circuit, and the second working chamber is fluidly coupled to a used fluid receptacle, and the second pumping chamber is fluidly coupled to the fresh fluid source, and the first pumping chamber is fluidly coupled to the inlet port of the accessed hydraulic fluid circuit, thereby providing a flow of used fluid from the outlet port of the accessed hydraulic circuit into the first working chamber, a flow of used fluid from the second working chamber into the used fluid receptacle, a flow of fresh fluid from the fresh fluid source into the second pumping chamber, and a flow of fresh fluid from the first pumping chamber into the inlet port of the accessed hydraulic circuit;

and wherein during a second operating condition the second working chamber is fluidly coupled to the outlet port of the accessed hydraulic circuit, and the first working chamber is fluidly coupled to the used fluid receptacle, and the first pumping chamber is fluidly coupled to the fresh fluid source, and the second pumping chamber is fluidly coupled to inlet port of the accessed hydraulic fluid circuit, thereby providing a flow of used fluid from the outlet port of the accessed hydraulic circuit into the second working chamber, a flow of used fluid from the first working chamber into the used fluid receptacle, a flow of fresh fluid from the fresh fluid source into the first pumping chamber, and a flow of fresh fluid from the second pumping chamber into the inlet port of the accessed hydraulic circuit.

21. The method of claim 20 further comprising the step of providing a control valve for changing the pump from the first operating condition to the second operating condition.

22. The method of claim 21 wherein the control valve includes at least one movable element which is engaged by a movable portion of the pump.

23. The method of claim 20 wherein the step of providing a pump includes the step of providing a pump having a reciprocating element in the form of a diaghragm or a piston.

24. A fluid exchange device for replacing used fluid from an accessed hydraulic circuit with fresh fluid from a fresh fluid source, sand device comprising:

a pump having at least four variable valume fluid chambers: a first working fluid chamber, a second working fluid chamber, a first pumping fluid chamber and a second pumping fluid chamber, said pump operating in a first operating condition or a second operating condition;

a first conduit for receiving used fluid from the accessed hydraulic circuit, said first conduit being in fluid communication with the first working fluid chamber when the pump is in the first operating condition, and said first conduit being in flid communication with the second working fluid chamber when the pump is in the second operation condition; and a second conduit for conducting fresh fluid to the accessed hydraulic circuit, said second conduit being in fluid communication with the second pumping fluid chamber when the pump is in the first operating condition, and said second conduit being in fluid communication with the first pumping fluid chamber when the pump is in the second operating condition.

25. A fluid exchange device for replacing used fluid from an accessed hydraulic circuit with fresh fluid from a fresh fluid source, said device comprising:

a pump having at least four variable volume fluid chambers: a first working fluid chamber, a second working fluid chamber, a first pumping fluid chamber and a second pumping fluid chamber, said first and second working chambers receiving used fluid from the accessed hydraulic circuit;

a first conduit for conducting used fluid from the accessed hydraulic circuit, said first conduit being in fluid communication with either the first working fluid chamber or the second working fluid chamber; and a second conduit for conducting fresh fluid to the accessed hydraulic circuit, said second conduit being in fluid communication with either the first pumping fluid chamber or the second pumping fluid chamber.

26. The fluid exchange device of claim 25, further comprising a fresh fluid source wherein said source is in fluid communication with the first or second fluid pumping chambers.

27. The fluid exchange device of claim 25, further comprising a used fluid receiver wherein said receiver is in fluid communication with either the first or second fluid working chamber.

* * * * *